United States Patent [19]

Socha

[11] Patent Number: 4,826,237
[45] Date of Patent: May 2, 1989

[54] DUMP BODY WITH SELF-CLEANING, FOLD DOWN SIDE DOORS

[75] Inventor: Gerhard P. Socha, Rugby
[73] Assignee: Rugby Manufacturing Co., Rugby, N. Dak.
[21] Appl. No.: 157,747
[22] Filed: Feb. 18, 1988
[51] Int. Cl.⁴ ............................................. B62D 33/02
[52] U.S. Cl. .................................... 296/184; 296/32; 296/36; 296/51
[58] Field of Search ................. 298/17.6, 17.7, 18; 296/10, 14, 32, 36, 57 R, 184, 57, 56; 105/258, 276, 378

[56] References Cited

U.S. PATENT DOCUMENTS

| | | | |
|---|---|---|---|
| 443,418 | 12/1890 | Wallace | 296/56 X |
| 644,655 | 3/1900 | Wiswell et al. | 296/32 |
| 738,863 | 9/1903 | White | 296/56 X |
| 1,536,523 | 5/1925 | Peterson | 296/51 |
| 1,573,750 | 2/1926 | Schreader | 296/36 X |
| 1,977,819 | 10/1934 | Burner | 105/276 X |
| 2,032,840 | 3/1936 | Flowers . | |
| 2,800,358 | 7/1957 | Sherrick . | |
| 3,128,120 | 4/1964 | Fournier et al. | 296/57 R |
| 3,316,019 | 4/1967 | Flowers . | |
| 3,884,526 | 5/1975 | Sweet et al. . | |
| 4,371,208 | 2/1983 | Stricker . | |

FOREIGN PATENT DOCUMENTS

| | | | |
|---|---|---|---|
| 1115594 | 10/1961 | Fed. Rep. of Germany | 298/17.7 |
| 53-32513 | 3/1978 | Japan | 296/184 |
| 54-40422 | 3/1979 | Japan | 296/184 |
| 54-49715 | 4/1979 | Japan | 296/184 |
| 56-39968 | 4/1981 | Japan | 296/36 |

OTHER PUBLICATIONS

J-Craft, Inc. brochure entitled "Contractor Bodies", undated.

Primary Examiner—Leslie J. Paperner
Attorney, Agent, or Firm—Merchant, Gould, Smith, Edell, Welter & Schmidt

[57] ABSTRACT

An improved dump body (18) includes opposite hinged side doors (34) and a hinged rear door (60). The side doors (34) include a latch assembly (42) and are particularly adapted to shed material in their down positions during unloading when the dump body (18) is level so that the side doors can then be raised and positively secured in their up positions without manual cleaning. The rear door (60) includes top and bottom hinges, and a latch assembly (70).

19 Claims, 3 Drawing Sheets

U.S. Patent    May 2, 1989    Sheet 1 of 3    4,826,237 of the invention can be had by
DUMP BODY WITH SELF-CLEANING, FOLD DOWN SIDE DOORS

TECHNICAL FIELD

The present invention relates generally to vehicle bodies. More particularly, this invention concerns a dump body for a truck having fold down side doors which are adapted to be self-cleaning when the doors are open and the dump body is level.

BACKGROUND OF THE INVENTION

Dump trucks are commonly used to haul bulk materials such as sand, gravel, dirt, etc. The dump body is typically located behind the cab and is hinged to the very back of the truck. A hoist operates to pivot the dump body between a down or level position and an up or tilted position wherein the load can be dumped out the rear door. Dump bodies with rear doors have been available for many years.

Side dump trucks have also been available heretofore. Instead of including a rear door, the dump bodies of side dump trucks include side doors through which the load can be dumped next to the truck. U.S. Pat. Nos. 4,371,208 to Stricker, 3,884,526 to Sweet and 3,316,019 to Flowers are representative of the prior art in this regard.

In some applications it is desirable to have a rear dump body with side doors that also fold down to allow the materials therein to be either fully or partially removed from either side, while the body is in the down or level position. For example, if maneuvering space is limited, there may not be enough room to raise the body and dump the materials out the back, although there may be sufficient space to off load the materials through side doors with a skid steer loader.

Dump bodies with both rear and side doors have also been available heretofore; however, the side doors of the dump bodies of the prior art tend to become clogged with material when the dump body is in the level position. This, of course, means that the side doors cannot be raised and closed without cleaning, which requires additional time and effort. Further, if not done thoroughly, this can interfere with proper latching of the side doors. Such clogging does not occur with dump bodies that tilt about an axis parallel to the door(s) through which material is dumped.

A need has thus arisen for an improved dump body having fold down side doors which are adapted to be self-cleaning when the body is in the down or level position so that the doors can then be closed and positively secured without first requiring cleaning by the operator.

SUMMARY OF THE INVENTION

The present invention comprises a dump body with self-cleaning, fold down side doors which overcomes the foregoing and other difficulties associated with the prior art. In accordance with the invention, there is provided an improved dump body having opposite fold down side doors. Each side door is hinged at the bottom to the corresponding edge of the floor or bottom wall of the dump body, between a pair of upright posts. In particular, the adjoining edges of the sides and bottom are angled in order to shed material when the side door is in the down position in order to avoid clogging so that the door can be raised and latched without requiring manual cleaning. Each side also includes a releasable latch arrangement. A rear door is also provided. In accordance with the preferred construction, the rear door includes a releasable latch arrangement at its lower end together with a removable support pin arrangement at its upper end so that it can be opened for dumping about about either a top or bottom hinge, as desired.

BRIEF DESCRIPTION OF THE DRAWINGS

A better understanding of the invention can be had by reference to the following Detailed Description in conjunction with the accompanying Drawings, wherein.

DETAILED DESCRIPTION

Figure 1:
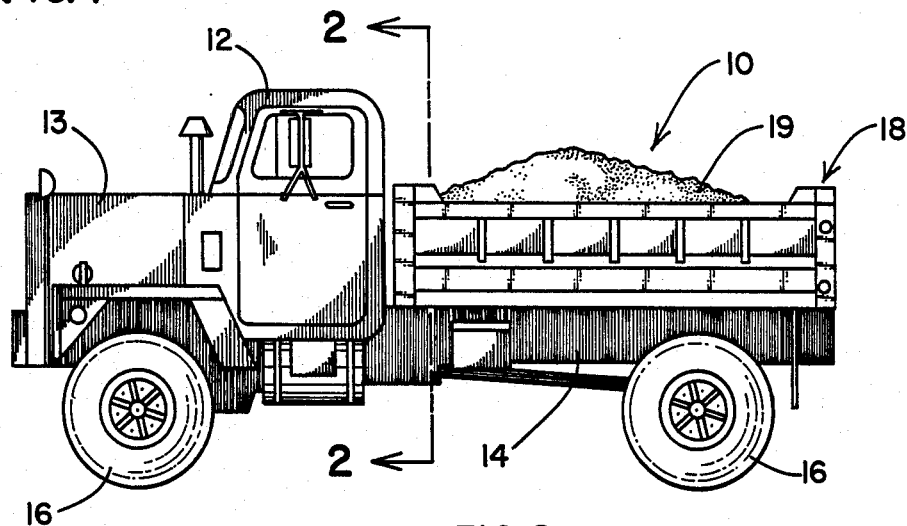
FIG. 1 is a side view of a dump truck incorporating the dump body of the present invention.

Referring now to the Drawings, wherein like reference numerals designate like or corresponding parts throughout the views, and particularly referring to FIG. 1, there is shown a dump truck 10 including a cab 12, engine compartment 13, chassis 14, wheels 16, and a dump body 18 incorporating the invention. The dump body 18 is pivotally secured at the rear of the chassis 14. A hoist (not shown) is provided between the chassis 14 and dump body 18 for moving the dump body between a down and level position as shown, and a raised or rearwardly tilted position wherein the materials 19 in the dump body can be dumped rearwardly in conventional fashion behind the truck 10. Such dump bodies 18 are typically used to haul bulk materials 19 such as dirt, sand, gravel and the like. As will be explained more fully hereinafter, the dump body 18 also includes fold down side doors which are adapted to be self-cleaning when the body is in the down or level position so that they can be raised and positively latched after unloading for greater safety without additional manual cleaning.

Figure 2:
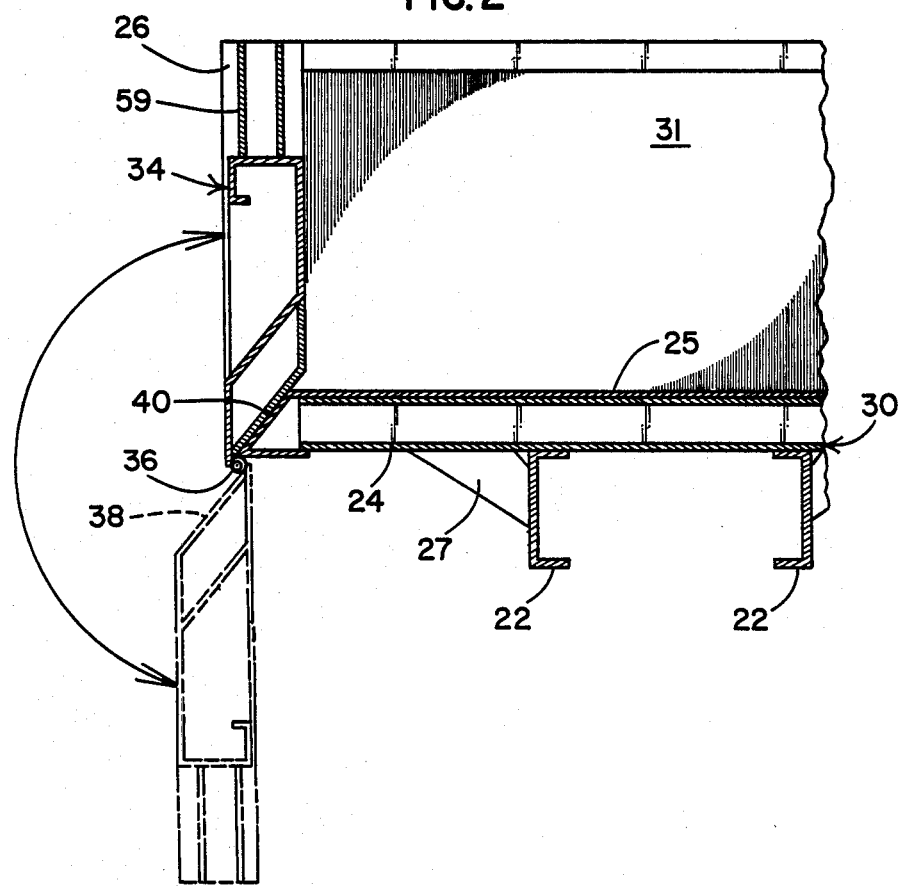
FIG. 2 is a partial sectional view taken along lines 2—2 of FIG. 1 in the direction of the arrows.

Referring now to FIGS. 1 and 2, the dump body 18, includes a pair of longitudinal members 22 which are rigidly secured, such as by welding, to a plurality of transverse cross members 24. Members 22 and 24 can comprise channel sections. A plate defining a floor or bottom wall 25 is secured to the tops of members 22 and 24. It will be noted that the outer longitudinal portions of bottom wall 25 are formed to angle downwardly and inwardly underneath the ends of members 24. Front and rear pairs of corner posts 26 and 28 are also provided. Gussets 27 are provided between members 22 and 24 and bottom wall 25 for reinforcement. These members are all interconnected, such as by welding, to form a rigid structure serving as the basic frame 30 of the dump body 18.

Figure 3:
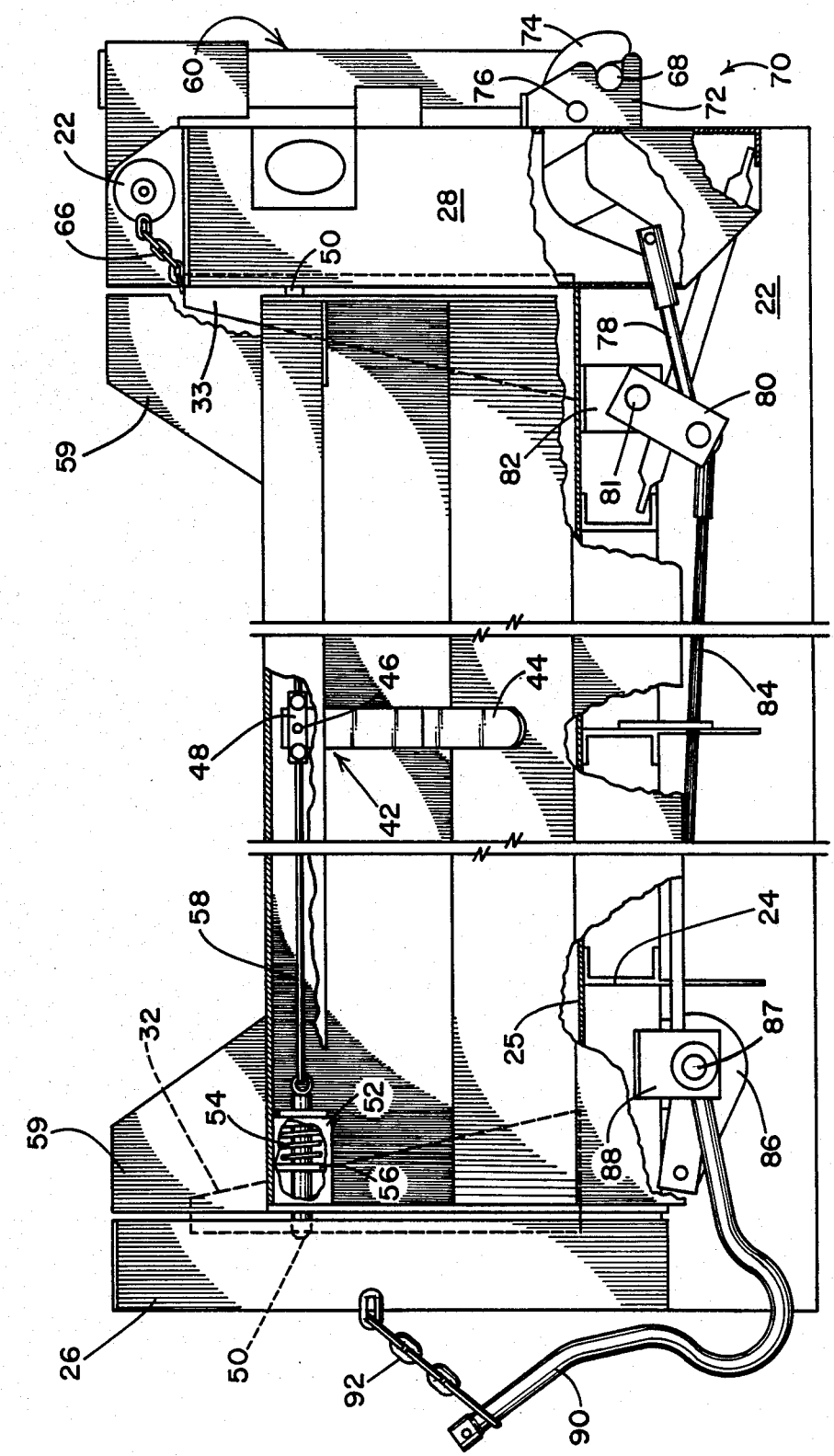
FIG. 3 is an enlarged, partially cutaway view of the side door of the dump body herein.

A front wall 31 is secured between the front corner posts 26. Angle-like braces 32 are preferably provided between each post 26 and the bottom wall 25 for additional reinforcement. Similarly, braces 33 can be provided between the lower ends of rear corner posts 28 and bottom wall 25 as is best seen in FIG. 3. If desired, a cab protector (not shown) can also be secured to posts 26 and wall 31.

Referring now to FIGS. 2 and 3, a pivotal side door 34 is provided between each front corner post 26 and the associated rear corner post 28 on each side of the dump body 18. In particular, each side door 34 is pivotally secured at its bottom end by hinges 36 to the side edges of the floor or bottom wall 25 for swinging movement over about 180 degrees as shown, between an up position and a down position. The up position of one of the side doors 34 is shown in solid lines in FIG. 2, with its down position being shown in phantom lines.

In accordance with the preferred embodiment, the adjoining surfaces of the side door 34 and bottom wall 25 are configured to shed material and thus be self-cleaning when the side wall is in the down position. It will be noted that the inside lower surface 38 of side door 34, and the outside outer surface 40 of the bottom wall 25 are at complementary angles, such as about 45°, to avoid accumulation of material when the side door is in the down position during unloading. This comprises a significant feature of the present invention.

Each side door 34 also includes a manual latch assembly 42, as is best seen in FIG. 3. The latch assembly 42 includes a lever 44 which is supported at its upper end by a pivot 46. A cross piece 48 is also secured to the upper end of lever 44, and each opposite end of the cross piece is in turn connected to a spring pin 50 on the associated side of the side door 34. The spring pins 50 are movable into and out of engagement with holes in the associated corner post 26 or 28. In particular, each spring pin 50 is movable within a cylinder 52 including a compression spring 54 which is provided therein between a washer 56 secured to the spring pin and one end of the cylinder so that the spring pin is normally biased outwardly into locking engagement with the adjacent corner post. The inner end of the spring pins 50 are connected by members 58 to one end of the cross piece on lever 44. Members 58 can comprise either a rigid link, such as a rod, or a flexible but inextensible link such as a chain or cable. The latter form is preferred because it avoids the possiblity of damage if the lever 44 is operated without the locking pin 50 being aligned with the locking hole in the corner post.

If desired, extensions 59 can be provided on the tops of side doors 34 for receiving boards to retain materials in the dump body 18.

Figure 4:
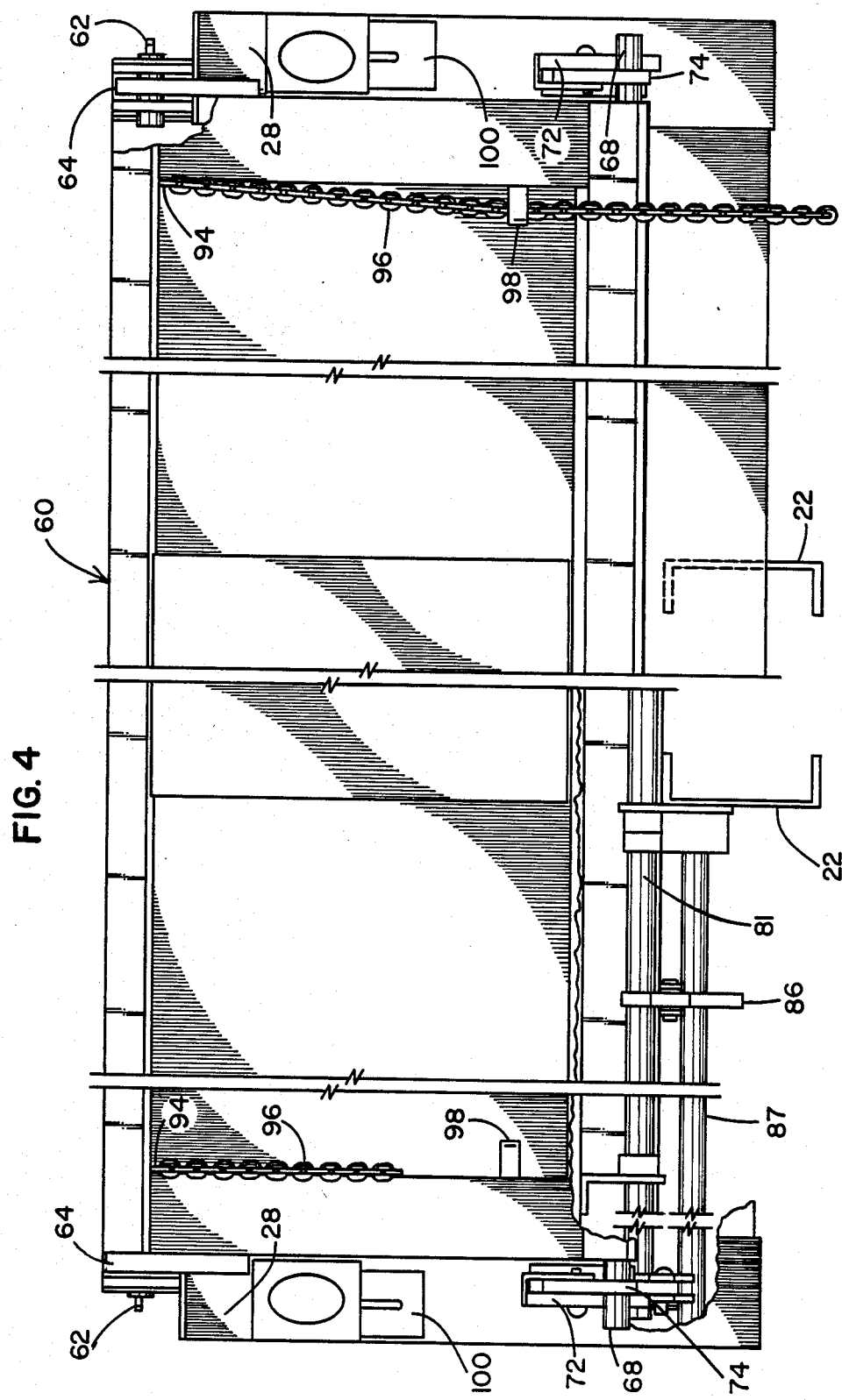
FIG. 4 is an enlarged, partially cutaway view of the rear door of the dump body herein.

Referring now to FIGS. 3 and 4, the dump body 18 also includes a rear door 60 between the rear corner posts 28. In accordance with the preferred construction, the rear door 60 is hinged for opening at either its top or bottom sides, In particular, the top end of the rear door 60 is pivotally secured by removable pins 62, one on each side, which extend through aligned openings in the upper end of each corner post 28 and a cooperating lug 64 on the rear door. The pins 62 are preferably also loosely connected to the post 28 by chains 66 to avoid being lost or misplaced when removed.

The bottom end of the rear door 60 includes a pair of oppositely extending pins or lugs 68 which cooperate with latch assemblies 70 on each side of the dump body 18. It will be noted that the pivot axis defined by the removable top pins 62 and that defined by the bottom lugs 68, are longitudinally offset, as is best seen in FIG. 2, so that the rear door 60 will be normally pivotally biased under gravity about its upper hinge into engagement with the lower latch assemblies 70.

The constructional details of the latch assemblies 70, only one of which is shown, can be best seen in FIG. 4. Each latch assembly 70 includes a fixed jaw 72 and a pivotal jaw 74 which are connected at pivot 76. The inner end of the pivotal jaw 74 is coupled by a connecting rod 78 to a link 80, the upper end of which is secured to a cross shaft 81 on a bracket 82 beneath the bottom wall 25. A similar linkage is provided on the opposite side of the dump body 18 for actuating the other jaws 72 and 74. The link 80 in turn is coupled by another connecting rod 84 to an over center crank 86 which is connected to another shaft 87 on another bracket 88 provided beneath the bottom wall 25. A handle 90 is also connected to the shaft 87 at the front end of the dump body 18 so that the dump truck operator can operate the lever 90 and thus simultaneously open or close the latch assemblies 70 in order to release or secure the rear door 60 as desired, without leaving the cab 12. The lever 90 is preferably secured in the up position with latch assemblies 80 locked by means of a chain 92.

The rear door 60 also preferably includes a hook 94 and a length of chain 96 together with a loop 98 on each side for cooperation with a notched bracket 100 on the adjacent corner post 28 in order to define a pivotal stop. By placing chain 96 through loop 96 and then locking the chain as desired by one of its links in the notched bracket 100, the maximum open pivotal position of the rear door 60 can thus be conveniently adjusted.

From the foregoing, it will thus be apparent that the present invention comprises an improved dump body having several advantages over the prior art. One significant advantage involves the fact that the dump body herein includes hinged side doors which are adapted to be self-cleaning when in their down positions in order to avoid collection of material thereon during unloading so that the side doors can then be raised and readily secured in their up position without the inconvenience of first manually cleaning off any remaining loose material. Other advantages will be evident to those skilled in the art.

Although particular embodiments of the invention have been illustrated in the accompanying Drawings and described in the foregoing Detailed Description, it will be understood that the invention herein is not limited only to the specific embodiments disclosed, but is intended to embrace any alternatives, equivalents, modifications and/or rearrangements of elements falling within the scope of the invention as defined by the following Claims.

What is claimed is:

1. A dump body, comprising:
   a generally rectangular bottom wall having front and rear ends;
   a pair of laterally spaced apart upright front posts secured to the front end of said bottom wall;
   a pair of laterally spaced apart upright rear posts secured to the rear end of said bottom wall;
   a front wall secured between said front posts and the front end of said bottom wall;
   a hinged side door secured between each front post and the associated rear post for pivotal movement over an obtuse angel between raised and lowered positions, the adjacent portions of said side door and said floor being angled downwardly and outwardly at complementary angles in order to shed material therefrom when said side door is in the lowered position without tilting the dump body;
   means for releasably securing each side door in the raised position;
   a hinged rear door secured between said rear posts for pivotal movement between open and closed positions;

means for releasably securing said rear door in the closed position.

2. The dump body of claim 1, wherein the adjacent portions of said side door and floor are angled downwardly and outwardly at about 45°.

3. The dump body of claim 1, wherein said means for releasably securing each side door in the raised position comprises:
a pair of pins mounted at opposite ends of said door for movement between extended positions in registry with holes in the adjacent front and rear posts, and retracted positions;
means for normally biasing said pins toward the extended positions;
a lever pivoted to said door between said pins; and
means for connecting said lever to said pins for selective manual actuation thereof toward the retracted positions.

4. The dump body according to claim 3, wherein said biasing means comprise compression springs.

5. The dump body according to claim 3, wherein said connecting means comprises flexible but inextensible links coupled between said lever and pins.

6. The dump body of claim 1, wherein said rear door is hinged for selective pivotal movement about a pair of vertically spaced-apart transverse axes, the upper axis being longitudinally offset forward from the lower axis so that said door is normally biased by gravity toward the closed position.

7. The dump body of claim 1, further including:
longitudinal braces interconnecting said front posts and bottom wall for reinforcement.

8. The dump body of claim 1, further including:
longitudinal braces interconnecting said rear posts and bottom wall for reinforcement.

9. The dump body of claim 1, further including:
a pair of opposing extensions of generally U-shaped cross-section secured to the top ends of each side door.

10. A dump body, which comprises:
a generally rectangular bottom wall having front and rear ends;
means including interconnected longitudinal and transverse from members secured beneath said bottom wall;
pairs of spaced-apart upright front and rear posts secured to the front and rear ends, respectively, of said bottom wall;
a front wall secured between said front posts and the front end of said bottom wall;
said doors positioned between associated front and rear posts, each side door including top and bottom ends;
means for pivotally securing the bottom end of each side door to said bottom wall for movement over an obtuse angle between raised and lowered positions;
the bottom ends of said side doors and adjacent portions of said bottom wall both being angled downwardly and outwardly at complementary angles in order to shed material therefrom when said side door is in the lowered position without tilting the dump body;
a pair of pins mounted at opposite sides of each side door for movement between extended positions in registry with holes in the adjacent front and rear posts, and retracted positions;
means for normally biasing said pins toward the extended positions to secure each side door in the raised position;
a lever pivoted to each side door between said pins;
means for connecting said lever to said pins for selective manual actuation thereof toward the retracted position in order to release said side door for movement toward the lowered position;
a hinged rear door secured between said rear posts for movement between open and closed positions; and
means for releasably securing said rear door in the closed position.

11. The dump body of claim 10, wherein said biasing means comprises compression springs.

12. The dump body of claim 10, wherein said connecting means comprises flexible but inextensible links coupled between said levers and pins.

13. The dump body of claim 10, wherein said rear door is hinged for selective pivotal movement about a pair of vertically spaced-apart transverse axes, the other axis being longitudinally offset forward from the lower axis so that said door is normally biased by gravity toward the closed position.

14. The dump of claim 10, further including:
adjustable means for limiting the maximum open position of said rear door.

15. A dump body, which comprises:
a generally rectangular bottom wall having front and rear ends;
means including interconnected longitudinal and transverse frame members secured beneath said bottom wall;
pairs of spaced-apart upright front and rear posts secured to the front and rear ends, respectively, of said bottom wall;
a front wall secured between said front posts and the front end of said bottom wall;
side doors positioned between associated front and rear posts, each side door including top and bottom ends;
means for pivotally securing the bottom end of each side door to said bottom wall for movement over about 180 degrees between raised and lowered positions;
the bottom ends of said side doors and adjacent portions of said bottom wall both being angled downwardly and outwardly at complementary angles in order to shed material therefrom when said door is in the lowered position without tilting the dump body;
means for releasably securing each side door in the raised position;
a rear door positioned between said rear posts, said rear door having top and bottom ends;
means for releasably securing the top end of said rear door to said rear posts for pivotal movement about an upper transverse axis between opened and closed positions; and
means for releasably securing the bottom end of said rear door to said rear posts for pivotal movement about a lower axis between raised and lowered positions, the upper and lower axes being longitudinally offset so that said rear door is normally biased by gravity about said upper axis toward the closed position.

16. The dump body of claim 15, wherein said means for releaseably securing each side door in the raised position comprises:
- a pair of pins mounted at opposite ends of said door for extended positions in registry with holes in the adjacent front and rear posts, and retracted positions;
- means for normally biasing said pins toward the extended positions;
- a lever pivoted to said door between said pins; and
- means for connecting said lever to said pins for selective manual actuation thereof toward the retracted positions.

17. The dump body according to claim 16, wherein said biasing means comprises compression springs.

18. The dump body according to claim 16, wherein said connecting means comprises flexible but inextensible links coupled between said lever and pins.

19. The dump body of claim 15, further including:
- adjustable means for limiting the maximum open position of said rear door.

* * * * *